(12) United States Patent
Abe et al.

(10) Patent No.: US 9,873,333 B2
(45) Date of Patent: Jan. 23, 2018

(54) PAVED STRUCTURE AND CONSTRUCTION METHOD FOR PAVED STRUCTURE

(71) Applicant: TOA ROAD CORPORATION, Tokyo (JP)

(72) Inventors: Nagato Abe, Yokohama (JP); Kazunori Manabe, Tsukuba (JP); Michio Yoshitake, Tsukuba (JP)

(73) Assignee: TOA ROAD CORPORATION, Tokyo (JP)

( * ) Notice: Subject to any disclaimer, the term of this patent is extended or adjusted under 35 U.S.C. 154(b) by 230 days.

(21) Appl. No.: 14/778,285

(22) PCT Filed: Aug. 28, 2013

(86) PCT No.: PCT/JP2013/073062
§ 371 (c)(1),
(2) Date: Sep. 18, 2015

(87) PCT Pub. No.: WO2014/147860
PCT Pub. Date: Sep. 25, 2014

(65) Prior Publication Data
US 2016/0229294 A1    Aug. 11, 2016

(30) Foreign Application Priority Data
Mar. 21, 2013 (JP) ................. 2013-058497

(51) Int. Cl.
*B60L 5/00* (2006.01)
*B60M 7/00* (2006.01)
(Continued)

(52) U.S. Cl.
CPC ............. *B60L 5/005* (2013.01); *B60L 11/182* (2013.01); *B60L 11/1831* (2013.01);
(Continued)

(58) Field of Classification Search
CPC ...... B60L 11/182; B60L 11/1833; B60L 9/00; B60L 11/1829; B60L 11/1809;
(Continued)

(56) References Cited

U.S. PATENT DOCUMENTS 4,361,202 A * 11/1982 Minovitch ......... B60K 31/0008
104/88.02
5,390,118 A *  2/1995 Margolis .................. B62D 1/28
180/168

(Continued)

FOREIGN PATENT DOCUMENTS

CN         1463868 A     12/2003
CN      201915316 U      8/2011
(Continued)

OTHER PUBLICATIONS

Chinese Office Action and Search Report for Chinese Application No. 201380074841.0, dated Jun. 6, 2016.
(Continued)

*Primary Examiner* — Mark T Le
(74) *Attorney, Agent, or Firm* — Birch, Stewart, Kolasch & Birch, LLP (57) ABSTRACT

A paved structure capable of feeding power to a traveling body in a noncontact manner. The paved structure feeding power to a power receiver provided in a traveling body through an electromagnetic wave, includes: a depression extending in the direction in which the traveling body runs; a magnetic member laid in the depression; a power feeding body laid on the upper surface of the magnetic member to feed power to the power receiver through an electromagnetic wave; and a power feeding body protector laid in the depression to cover the power feeding body.

10 Claims, 9 Drawing Sheets

(51) Int. Cl.
  *H02J 17/00* (2006.01)
  *E01C 1/00* (2006.01)
  *H02J 7/02* (2016.01)
  *B60L 11/18* (2006.01)
  *H01F 38/14* (2006.01)
  *E01C 9/00* (2006.01)
  *H02J 50/10* (2016.01)

(52) U.S. Cl.
  CPC ............ *B60M 7/003* (2013.01); *E01C 1/00* (2013.01); *E01C 9/00* (2013.01); *H01F 38/14* (2013.01); *H02J 7/025* (2013.01); *H02J 17/00* (2013.01); *H02J 50/10* (2016.02); *B60L 2250/16* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
  CPC ......... B60L 5/005; B60M 7/003; B60M 7/00; H02J 5/005; H02J 7/025; H02J 17/00; H01F 38/14; G05D 1/0265
  USPC ............................................. 191/10; 180/168
  See application file for complete search history.

(56) References Cited

U.S. PATENT DOCUMENTS

| | | | |
|---|---|---|---|
| 5,573,090 A | 11/1996 | Ross | |
| 5,595,271 A | 1/1997 | Tseng | |
| 6,049,191 A | 4/2000 | Terazoe et al. | |
| 2008/0129246 A1 | 6/2008 | Morita et al. | |
| 2011/0052317 A1 | 3/2011 | Jeter et al. | |
| 2011/0094840 A1 | 4/2011 | Sakita | |
| 2011/0186368 A1 | 8/2011 | Ueno et al. | |
| 2012/0186927 A1 | 7/2012 | Suh et al. | |
| 2012/0306262 A1* | 12/2012 | Taguchi | B60L 3/00 307/9.1 |
| 2012/0318625 A1 | 12/2012 | Woronowicz et al. | |
| 2013/0092491 A1 | 4/2013 | Suh et al. | |
| 2014/0145518 A1* | 5/2014 | An | H02J 17/00 307/104 |
| 2015/0035481 A1 | 2/2015 | Cho et al. | |

FOREIGN PATENT DOCUMENTS

| | | | |
|---|---|---|---|
| CN | 201966647 U | 9/2011 | |
| CN | 102465482 | 5/2012 | |
| DE | 102008013649 A1 | 10/2009 | |
| EP | 0488305 A1 | 6/1992 | |
| EP | 2515314 A1 | 10/2012 | |
| GB | 2485616 A | 5/2012 | |
| JP | 6-78406 A | 3/1994 | |
| JP | 11-238638 A | 8/1999 | |
| JP | 2000-116036 A | 4/2000 | |
| JP | 2005-224045 A | 8/2005 | |
| JP | 2007-12775 A | 1/2007 | |
| JP | 2010-22183 A | 1/2010 | |
| JP | 2010-172084 A | 8/2010 | |
| JP | 2011-49230 A | 3/2011 | |
| JP | 2011-135772 A | 7/2011 | |
| KR | 10-2005-0080017 A | 8/2005 | |
| KR | 10-2011-0041937 A | 4/2011 | |
| WO | WO 2011/076437 A2 | 6/2011 | |
| WO | WO 2011/078616 A2 | 6/2011 | |
| WO | WO 2012/050345 A2 | 4/2012 | |
| WO | WO 2012/069495 A2 | 5/2012 | |
| WO | WO 2012/141357 A1 | 10/2012 | |

OTHER PUBLICATIONS

Extended European Search Report for European Application No. 13878844.3, dated Oct. 6, 2016.
Extended European Search Report for European Application No. 13879131.4, dated Oct. 6, 2016.
Office Action issued in the corresponding Korean Patent Application No. 10-2015-7025755 dated Jan. 3, 2017.
Office Action issued in the corresponding Korean Patent Application No. 10-2015-7025756 dated Jan. 3, 2017.
1 International Search Report, issued in PCT/JP2013/071764, dated Oct. 8, 2013.
Choudhury et al., "Inductive Power Transfer to Highway Vehicles", The Engineering Society for Advancing Mobility Land Sea Air and Space, 891706, 1989, pp. 51-60.
International Search Report, issued in PCT/JP2013/073062, dated Oct. 8, 2013.
Chinese Office Action and Chinese Search Report, dated Jun. 2, 2016, for Chinese Application No. 201380074839.3.

* cited by examiner

PAVED STRUCTURE AND CONSTRUCTION METHOD FOR PAVED STRUCTURE

TECHNICAL FIELD

The present invention relates to a paved structure on which a traveling body such as an automobile runs and a method of constructing the paved structure. Particularly, the present invention relates to a paved structure capable of feeding power to a traveling body in a noncontact manner and a method of constructing the paved structure.

BACKGROUND ART

Traveling bodies such as electric vehicles (EV) and hybrid electric vehicles (HEV) that are loaded with a secondary cell rotate the motor by using power stored in the secondary cell to drive the wheels. From the viewpoint of environmental safeguard, the traveling bodies running by power stored in the secondary cell are desired to become widely used, since they hardly exhaust environmentally infective material as nitrogen oxide and carbon dioxide.

The electric vehicles traveling by power of the secondary cell have to be charged when the charged capacity of the secondary cell decreases. Generally, to charge such electric automobiles, the electric vehicles are connected with a power feeder at charging stations or at home. This charging method damages the connection due to wear-out, etc., not to obtain enough contact force and therefore requires maintenance to obtain enough contact force. Furthermore, this charging method may cause sparks in the connection and cannot therefore be used in an explosion-proof area. To solve these problems, a method of charging an electric vehicle in a noncontact manner has been proposed, in which the coil provided in the electric vehicle is aligned with that in a certain place at a charging station, etc. to generate power by electromagnetic induction (for example, see Patent Documents 1 to 3).

CITATION LIST

Patent Literature

Patent Document 1: JP 2010-172084 A
Patent Document 2: JP 2011-49230 A
Patent Document 3: JP H11-238638 A

SUMMARY OF INVENTION

Technical Problem

These proposals enable the electric vehicle to be charged in a noncontact manner with a power feeder. However, the electric vehicle has to stay in place until the secondary cell is completely charged. Therefore, these proposals have problems because the electric vehicle has to stop at considerably many charging stations, etc. and spend considerable time to charge the secondary cell when the electric vehicle travels long distance.

In consideration of the above-mentioned circumstances, the present invention has been achieved. Therefore, an objective of the present invention is to provide a paved structure capable of feeding power to a traveling body in a noncontact manner and a method of constructing the paved structure.

Solution to Problem

The present invention provides [1] to [12] described below.

[1] A paved structure feeding power to a power receiver provided in a traveling body through an electromagnetic wave, including:
a depression extending in the direction in which the traveling body runs;
a magnetic member laid in the depression so that a flat upper surface is formed;
a power feeding body laid on the upper surface of the magnetic member to feed power to the power receiver through an electromagnetic wave; and
a power feeding body protector laid in the depression to cover the power feeding body.

[2] The paved structure according to [1], further including:
a reinforcement with a predetermined width laid in the depression, in which
the power feeding body is attached to the reinforcement.

[3] The paved structure according to [2], in which
the reinforcement is a mesh net with a constant width and a constant length; and
the power feeding body is coiled and attached to the net.

[4] The paved structure according to [1] or [2], in which an electromagnetic wave shield is concaved on the inner surface of the depression, and the magnetic member is laid in the concave of the electromagnetic wave shield.

[5] The paved structure according to [4], in which the electromagnetic wave shield has a partition in the center of the depression to form two grooves in the depression, and the power feeding body is laid in each of the two grooves.

[6] The paved structure according to [4] or [5], in which the electromagnetic wave shield is formed from a stainless panel or net, an aluminum panel or net, or combination thereof.

[7] The paved structure according to any one of [1] to [6], in which the power feeding body protector is the same magnetic body as or a different magnetic body from the magnetic member.

[8] The paved structure according to any one of [1] to [7], in which the magnetic member contains magnetic slag.

[9] The paved structure according to any one of [1] to [8], further including:
a visible part visible from the traveling body, in which
the visible part is provided on the upper surface of the power feeding body protector over the power feeding body.

[10] The paved structure according to [9], in which the visible part is colored in a color different from that of the power feeding body protector.

[11] The paved structure according to [9] or [10], in which the visible part is formed of a retro reflective material.

[12] A method of constructing the paved structure according to any one of [1] to [11], including the steps of
forming a depression in the paved structure;
laying a magnetic member in the depression; and
laying a power feeding body on the magnetic member.

Advantageous Effects of Invention

The present invention provides a paved structure capable of feeding power to a traveling body in a noncontact manner and a method of constructing the paved structure.

DESCRIPTION OF EMBODIMENTS

First Embodiment

Figure 1:
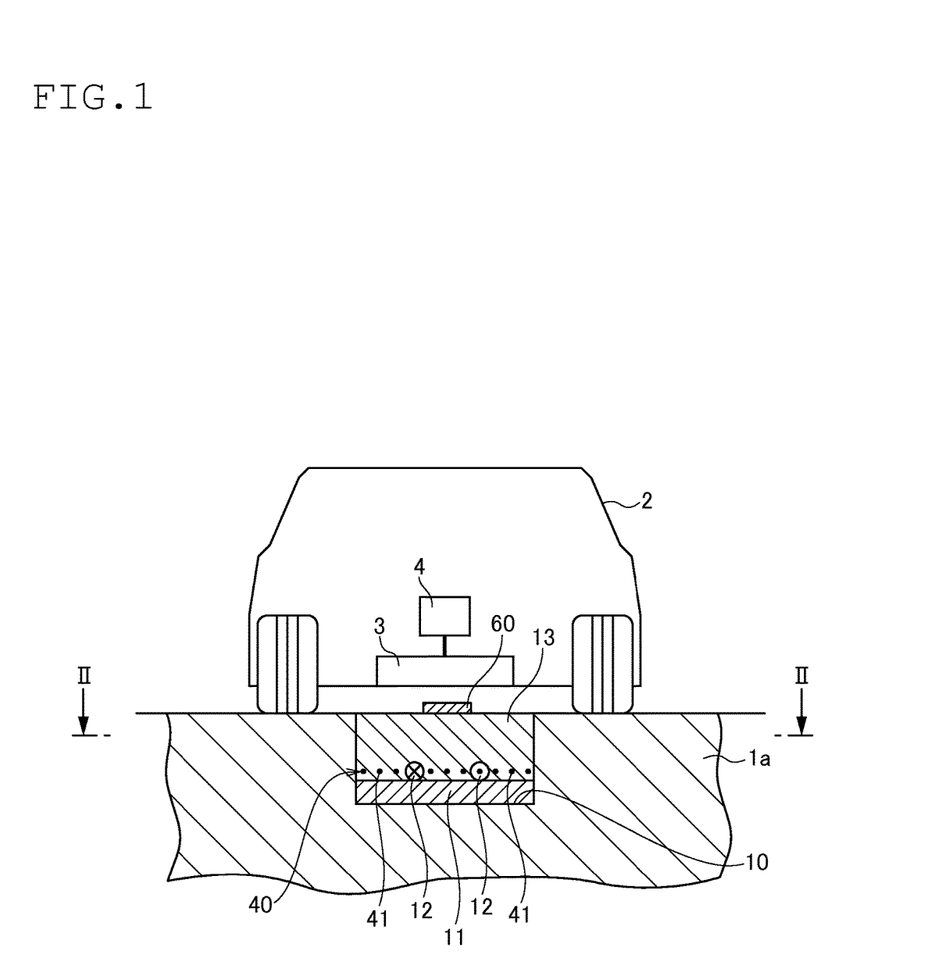
FIG. 1 shows a schematic cross-sectional view of the paved structure according to the first embodiment of the present invention.

As shown in FIG. 1, the paved structure 1a according to the first embodiment of the present invention, which feeds power to a power receiver 3 provided in a traveling body 2 through an electromagnetic wave, includes: a depression 10 extending in the direction in which the traveling body 2 runs; a magnetic member 11 laid in the depression 10 so that a flat upper surface is formed; a power feeding body 12 laid on the upper surface of the magnetic member 11 to feed power to the power receiver 3 through an electromagnetic wave; and a power feeding body protector 13 laid in the depression 10 to cover the power feeding body 12.

The paved structure 1a is a paved road, etc. on which a traveling body 2 can run. For example, the paved structure 1a is paved with cement concrete, asphalt concrete, etc. and composed of a subgrade, a base layer, and a surface layer in descending order of depth. The paved structure 1a paved with cement concrete, asphalt concrete, etc. is provided with a depression 10, a magnetic member 11, a power feeding body 12, and a power feeding body protector 13 in the base layer and the surface layer.

Figure 2:
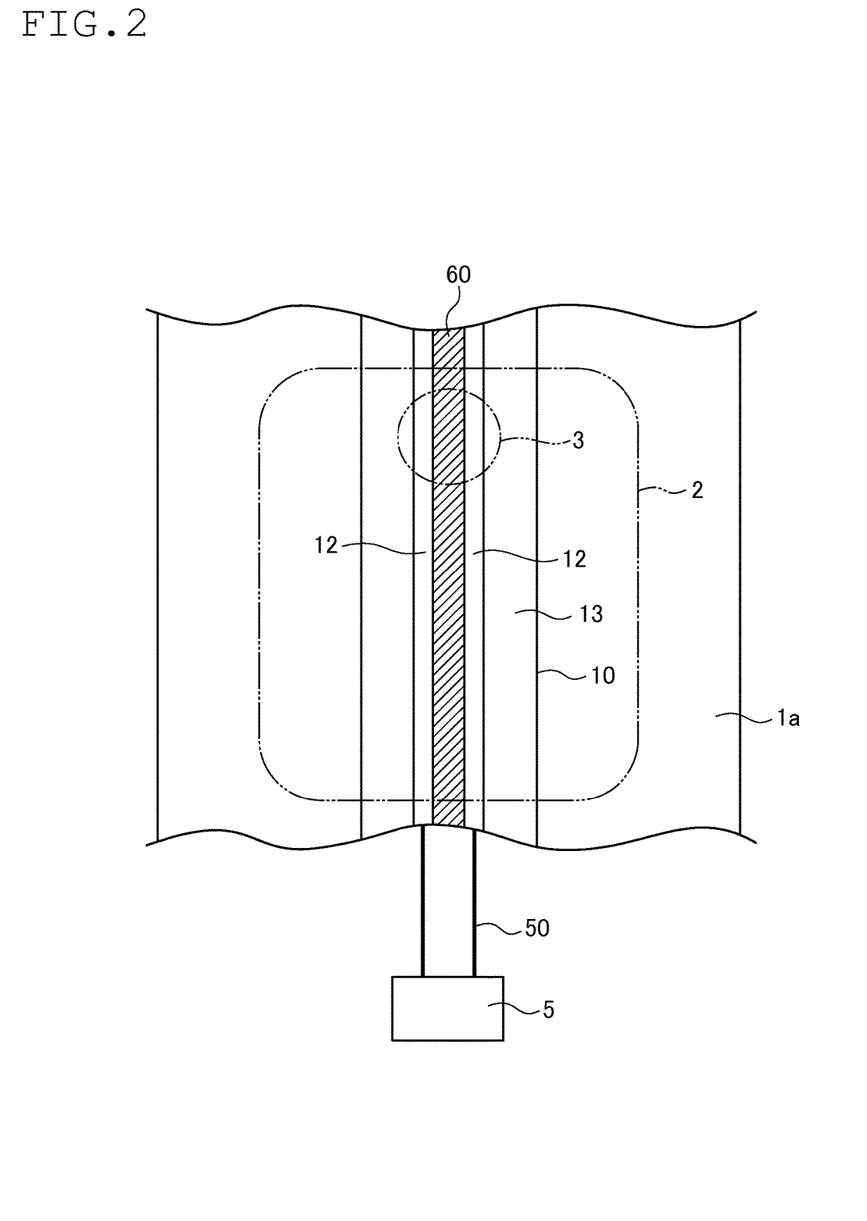
FIG. 2 shows a schematic cross-sectional view along the direction II-II shown in FIG. 1.

As shown in FIG. 2, the depression 10 extends in the direction in which the traveling body 2 runs. The depression 10 is formed by being cut off from the paved structure 1a by a cutter, etc. In the depression 10, a magnetic member 11, a power feeding body 12, and a power feeding body protector 13 are laid. From the viewpoint of having these elements inside, the depression 10 has a width of preferably from 0.3 to 2.0 m, more preferably from 0.5 to 1.0 m, and a depth of preferably from 50 to 200 mm, more preferably from 80 to 150 mm.

Figure 3A:
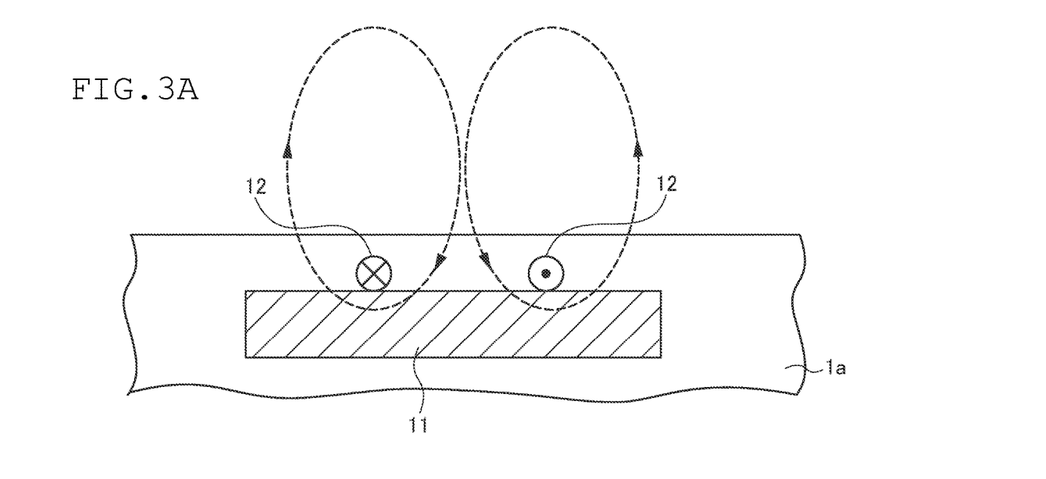
FIGS. 3A and 3B show a schematic view illustrating an effect of the magnetic member in the paved structure according to the first embodiment of the present invention.
Figure 3B:
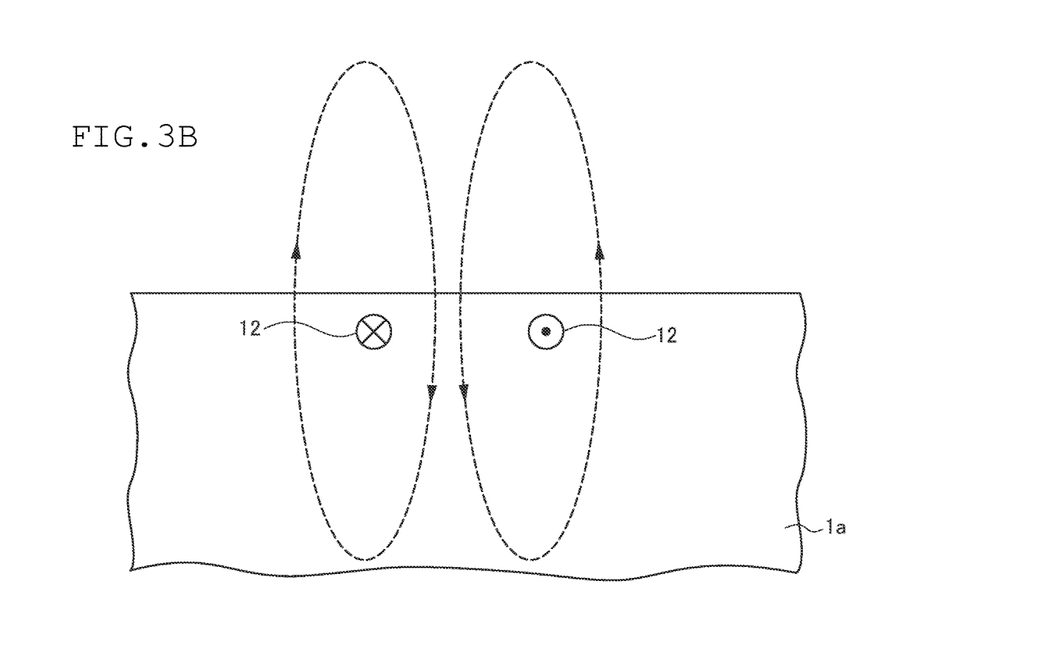

As shown in FIG. 3A, the magnetic member 11 is laid in the ground deeper than the power feeding body 12 so that a flat upper surface is formed to control the range in the magnetic field generated by the power feeding body 12. The dotted lines in FIG. 3A show magnetic flux. If no magnetic members 11 are not laid, magnetic flux generated by the power feeding body 12 penetrates deeper in the paved structure 1a as shown in FIG. 3B. The dotted lines in FIG. 3B also show magnetic flux. If a magnetic member 11 with a flat upper surface is laid, the magnetic flux can be converged in the surface side of the paved structure 1a without penetrating deeper in the paved structure 1a. In other words, the magnetic member 11 converges magnetic flux to form a strong magnetic field, so that the electromagnetic wave caused by a changing magnetic field can be strengthened.

In addition, since the upper surface of the magnetic member 11 is flat, the magnetic flux converged in the surface side has a width approximately equal to that of the magnetic member 11. This hardly irregularly converges magnetic flux in the width direction of the magnetic member 11. Therefore, feeding power to the power receiver 3 in a traveling body 2 does not influenced too much even if the traveling body 2 runs a little off from the depression 10.

The magnetic member 11 is formed of a magnetic body such as magnetic slag. Magnetic slag is slag aggregate that contains from 50 to 80 mass % of a magnetic body such as iron. The magnetic member 11 contains preferably from 10 to 40 mass %, more preferably from 15 to 35 mass % of magnetic slag from the viewpoint of increasing the conductivity. Since magnetic slag is hard, preferably 10 mass % or more, more preferably 15 mass % or more of magnetic slag is mixed in the magnetic member 11 from the viewpoint of maintaining the durability of the magnetic member 11 over which a heavy traveling body 2 such as a truck also passes.

The magnetic member 11 has a thickness of preferably 30 mm or more, more preferably 50 mm or more, from the viewpoint of converging the magnetic flux in the surface side of the paved structure 1a.

As shown in FIG. 1, the magnetic member 11 is laid in the depression 10 so that the upper surface of the magnetic member 11 is flat. Since laid in the depression 10, the magnetic member 11 is formed in a plate shape.

Figure 4:
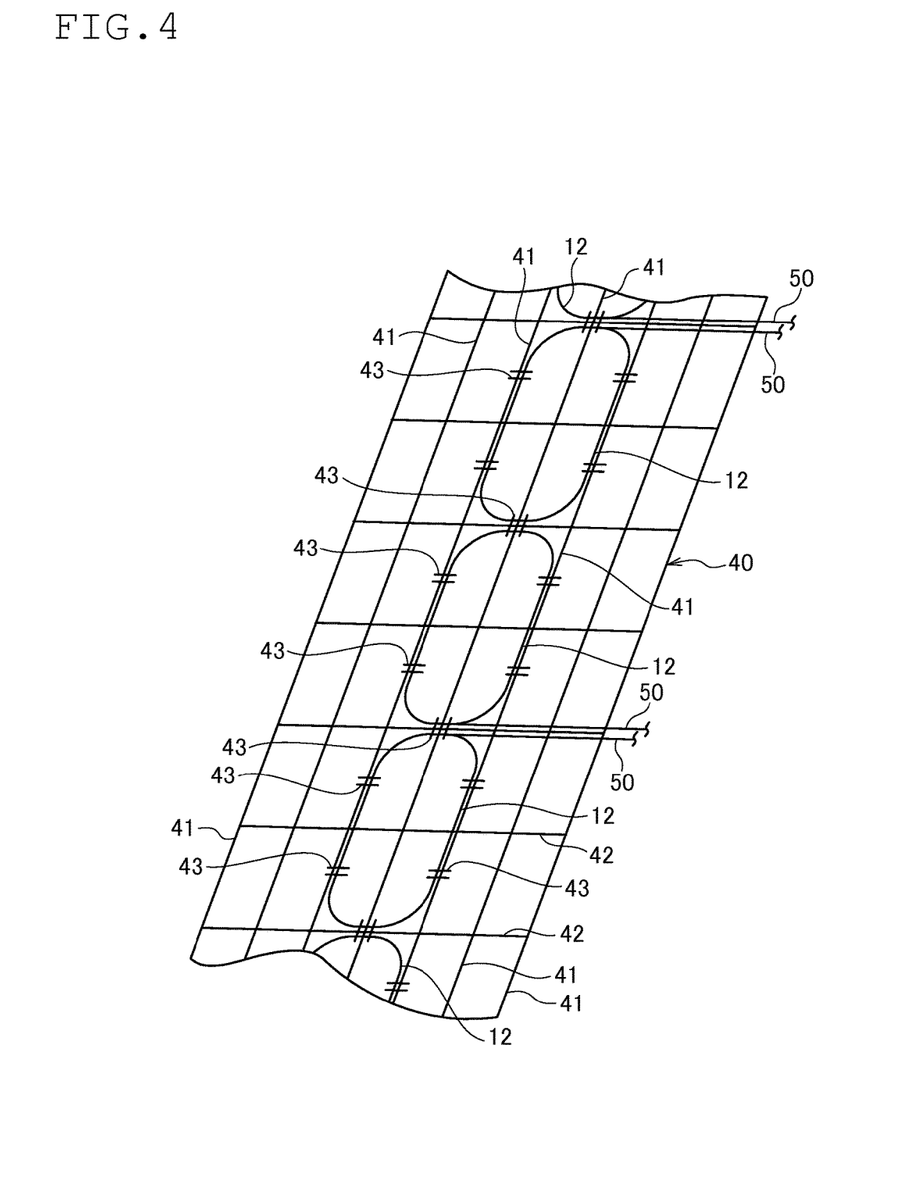
FIG. 4 shows an external perspective view illustrating the enforcement fitting a feeder in the paved structure according to the first embodiment of the present invention.

As shown in FIG. 4, the power feeding body 12 is coiled in an oval shape. The oval shape of the power feeding body 12 is composed of combining semicircles and a parallel part. The parallel part is composed of conductors (electric wires) placed in parallel to apply electric current in the direction opposite to each other.

As shown in FIG. 2, the power feeding body 12 receives high-frequency electric current from a power feeding facility 5 through a power feeding line 50 to generate a magnetic field. The power feeding body 12 then receives alternating current to change the magnetic field and the electric field according to the frequency of the alternating current, so as to generate electromagnetic waves.

The power feeding body protector 13 is provided to cover and protect the power feeding body 12 from impact, etc., from a traveling body 2 running on the paved structure 1a. The power feeding body protector 13 protects the power feeding body 12 from external force to prevent the power feeding body 12 from physical damage such as cutoff and bending. The power feeding body protector 13 has an elastic modulus of preferably 1000 MPa or more, more preferably 3000 MPa or more, from the viewpoint of protecting the power feeding body 12. Furthermore, the power feeding body protector 13 has a uniaxial compressive strength of preferably 1 MPa or more, more preferably 3 MPa or more, from the viewpoint of protecting the power feeding body 12. Yet furthermore, the power feeding body protector 13 has a thickness of preferably 30 mm or more, more preferably 50 mm or more to cover the power feeding body 12, from the viewpoint of protecting the power feeding body 12.

As shown in FIG. 1, the traveling body 2 is an electric vehicle (EV), an hybrid vehicle (HEV), etc., which has a power receiver 3 near the floor chassis to receive electromagnetic waves emitted from the power feeding body 12 and also has a secondary cell 4, for example, under the floor of the vehicle interior. The traveling body 2 rotates the motor (not shown) by using power stored in the secondary cell 4 to drive the wheels.

The power receiver 3 is a coil, etc. that can obtain power by the electromagnetic induction phenomenon caused by electromagnetic waves. The power receiver 3 is connected with the secondary cell 4 to deliver the obtained power to the secondary cell 4. The power receiver 3 preferably has an amplifier, etc. to amplify the power.

The power receiver 3 receives electromagnetic waves emitted from the power feeding body 12 and obtains the power generated by the electromagnetic induction phenomenon caused by magnetic flux flow. The power obtained by the power receiver 3 is stored in the secondary cell 4 through a control circuit (not shown) controlling charge, discharge, etc.

The secondary cell 4 is provided with a control circuit controlling charge, discharge, etc., a cooling device, etc. As the secondary cell 4, cells capable of charge and discharge, such as lithium-ion cells can be used.

As shown in FIG. 2, the power feeding facility 5 is electrically connected with the power feeding body 12 through a power feeding line 50 embedded in the ground. The power feeding facility 5 is an alternator, which supplies high-frequency electric current. The power feeding facility 5 is preferably located outside running lanes.

How to produce the reinforcement with a power feeding body is described below in reference to FIG. 4 as preparation for construction of the paved structure 1a according to the first embodiment.

Production of Reinforcement with Power Feeding Bodies

As shown in FIG. 4, a plurality of power feeding bodies 12 are fixed to or coupled with the reinforcement 40 to easily lay the power feeding bodies 12 with a constant width and a constant length on the site.

For example, the reinforcement 40 is a mesh net formed from multiple warps 41 and multiple woofs 42, which has multiple string knots 43 in the warps 41 and the woofs 42 to fix the power feeding body 12. The reinforcement 40 has a width approximately equal to that of the depression 10.

The warps 41 and the woofs 42 preferably form rectangles of the same size.

On the reinforcement 40, the power feeding bodies 12 are each coiled at a predetermined location of the warps 41 and the woofs 42 and fixed with knots 43.

This enables the power feeding bodies 12 formed in a certain shape and attached to the reinforcement 40 in a place with facilities, for example, in a factory, previously, to be carried in a construction site. Therefore, the power feeding bodies 12 do not require to be coiled while being measured on a construction site. Furthermore, a plurality of power feeding bodies 12 uniformly coiled can be coupled with each other and laid on a construction site.

The method of constructing the paved structure 1a according to the first embodiment is described below in reference to FIGS. 5A to 5D. The paved structure 1a according to the first embodiment is constructed outdoors, for example, in expressways.

Step of Forming Depression

Figure 5A:
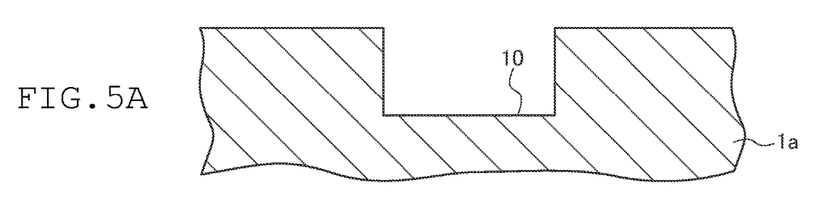
FIGS. 5A to 5D show a process cross-sectional view illustrating the method of constructing the paved structure according to the first embodiment of the present invention.

First, in the step shown in FIG. 5A, a depression 10 with a desired width and a desired depth is formed in the paved structure 1a with a cutter, etc.

Step of Laying Magnetic Body

Figure 5B:
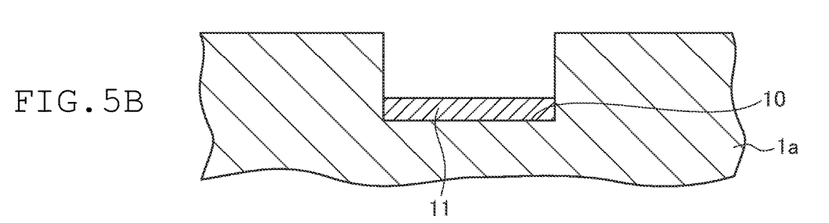

Subsequently, in the step shown in FIG. 5B, a magnetic member 11 is laid in the depression 10 so that the upper surface of the magnetic member 11 is flat. Since the upper surface of the magnetic member 11 is flat, the magnetic member 11 can be easily constructed.

Step of Laying Power Feeding Body

Figure 5C:
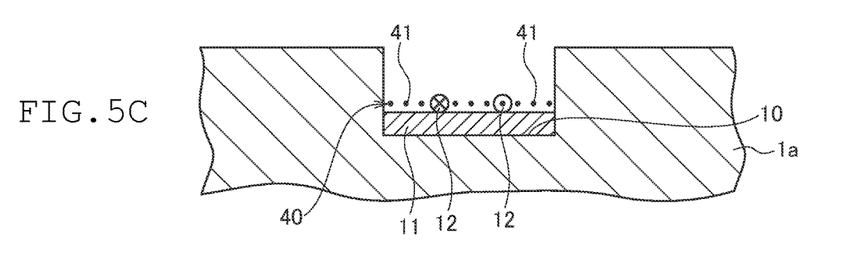

Subsequently, in the step shown in FIG. 5C, the reinforcement 40 with power feeding bodies 12 is laid on the magnetic member 11 to lay the power feeding bodies 12 in the depression 10. Since integrally wired, the power feeding bodies 12 are efficiently laid by a cable laying car and a cable reel car.

Step of Laying Power Feeding Body Protector

Figure 5D:
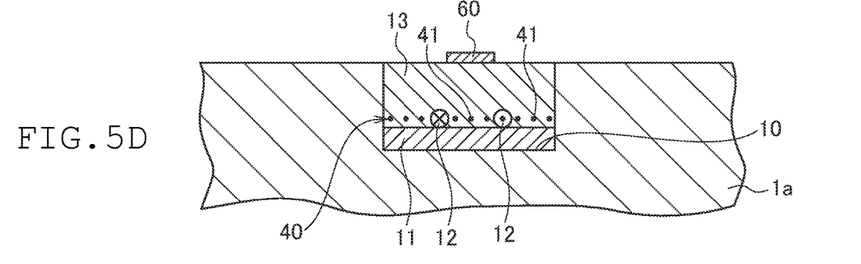

Subsequently, in the step shown in FIG. 5D, a power feeding body protector 13 is laid to cover the power feeding bodies 12 laid on the magnetic member 11. For example, cement asphalt emulsion mortar (CAM), etc. can be used as the power feeding body protector 13.

In addition, dense-graded asphalt concrete or polymer-cement concrete may be laid on the surface layer of the paved structure 1a.

In addition, a visible part 60 may be provided on the surface layer of the paved structure 1a to make the position in which the power feeding bodies 12 are buried visible from a traveling body 2. Specifically, the visible part 60 that is, for example, specially paved and extends in the direction in which the paved structure 1a extends is provided on the paved structure 1a (road surface) in which the power feeding bodies 12 are embedded to inform a driver who drives a traveling body 2 about the position in which the power feeding bodies 12 are buried.

The paved structure 1a is provided with a visible part 60 in this way, so that the driver can easily identify the position in which the power feeding bodies 12 are buried when needing charge the traveling body 2.

This enables a person getting on a traveling body 2 or a car-mounted camera in a traveling body 2 to recognize the visible part 60 paved in a color, so as to control the direction in which the traveling body 2 runs. As a result, the traveling body 2 can run to accurately position the power receiver 3 over the power feeding bodies 12 without going off the power feeding bodies 12 to increase the power receiving efficiency of the power receiver 3.

How the paved structure 1a feeds power is explained below.

While running by using the power saved in the secondary cell 4, the traveling body 2 consumes power from the secondary cell 4 and requires to be charged. The traveling body 2 required to be charged then runs on the paved structure 1a in which the power feeding bodies 12 are embedded.

While the traveling body 2 runs on the paved structure 1a in which the power feeding bodies 12 are embedded, the power feeding body 12 receives high-frequency electric current from a power feeding facility 5 and generates and emits electromagnetic waves to the traveling body 2. The power receiver 3 of the traveling body 2 running over the power feeding bodies 12 receives the emitted electromagnetic waves. The power receiver 3 obtains power from the voltage generated by an electromagnetic wave change by using the electromagnetic induction phenomenon caused by the received electromagnetic waves. The power receiver 3 delivers the obtained power and charges the secondary cell 4.

The paved structure 1a according to the first embodiment can feed power to a running traveling body 2 through an electromagnetic wave. Therefore, the secondary cell 4 can be charged while a traveling body 2 is running. As a result, the traveling body 2 keeps running without stopping by a charging station, etc., even when running long distance as an electric vehicle.

Second Embodiment

Figure 6:
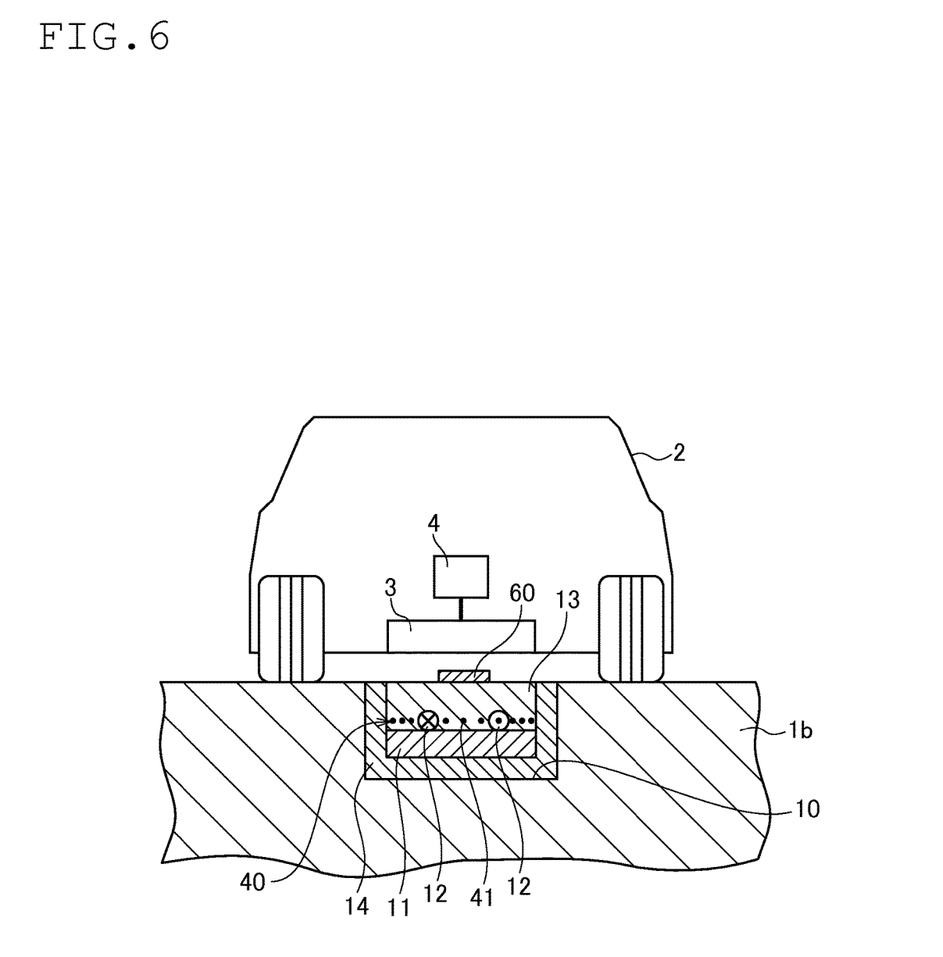
FIG. 6 shows a schematic cross-sectional view of the paved structure according to the second embodiment of the present invention.

The paved structure 1b according to the second embodiment of the present invention is the same as the paved structure 1a according to the first embodiment except that an electromagnetic wave shield 14 is concaved on the inner surface of the depression 10 as shown in FIG. 6. The explanation of the same part is left out.

The electromagnetic wave shield 14 cuts off the electromagnetic waves emitted from the power feeding body 12 so as not to propagate electromagnetic waves in the ground.

The electromagnetic wave shield 14 preferably contains aggregate formed of stainless, aluminum, or combination thereof and a concrete covering the aggregate.

Alternatively, the electromagnetic wave shield 14 is preferably formed from a stainless panel or net, an aluminum panel or net, or combination thereof.

The method of constructing the paved structure 1b according to the second embodiment is described below in reference to FIGS. 7A to 7E.

Step of Forming Depression

Figure 7A:
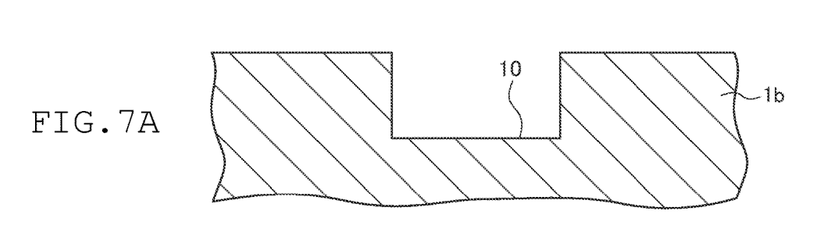
FIGS. 7A to 7E show a process cross-sectional view illustrating the method of constructing the paved structure according to the second embodiment of the present invention.

First, in the step shown in FIG. 7A, a depression 10 with a desired width and a desired depth is formed in the paved structure 1b with a cutter, etc.

Step of Laying Electromagnetic Wave Shield

Figure 7B:
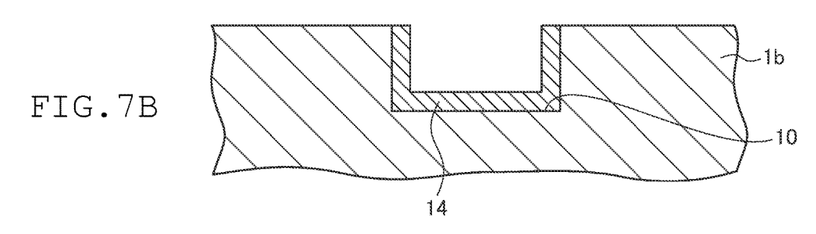

Subsequently, in the step shown in FIG. 7B, an electromagnetic wave shield 14 is concaved in contact with the inner surface of the depression 10.

Step of Laying Magnetic Body

Figure 7C:
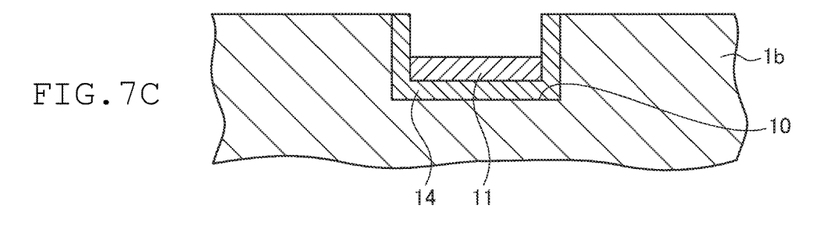

Subsequently, in the step shown in FIG. 7C, a magnetic member 11 is laid in the electromagnetic wave shield 14.

Step of Laying Power Feeding Body

Figure 7D:
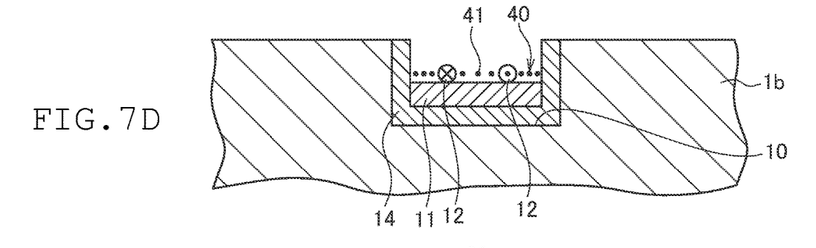

Subsequently, in the step shown in FIG. 7D, power feeding bodies 12 are laid on the magnetic member 11. Since integrally wired, the power feeding bodies 12 are efficiently laid by a cable laying car and a cable reel car.

Step of Laying Power Feeding Body Protector

Figure 7E:
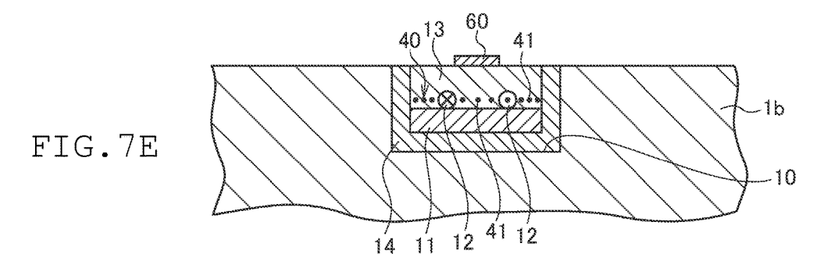

Subsequently, in the step shown in FIG. 7E, a power feeding body protector 13 is laid to cover the power feeding bodies 12 laid on the magnetic member 11. For example, cement asphalt emulsion mortar (CAM) can be used as the power feeding body protector 13.

In addition, dense-graded asphalt concrete or polymer-cement concrete may be laid on the surface layer of the paved structure 1b.

In addition, a visible part 60 may be provided on the surface layer of the paved structure 1b to make the position in which the power feeding bodies 12 are buried visible from a traveling body 2. Specifically, the visible part 60 that is, for example, specially paved and extends in the direction in which the paved structure 1b extends is provided on the paved structure 1b (road surface) in which the power feeding bodies 12 are embedded to inform a driver who drives a traveling body 2 about the position in which the power feeding bodies 12 are buried.

The thus formed paved structure 1b according to the second embodiment of the present invention can obtain a similar effect to that of the paved structure 1a according to the first embodiment.

In addition, the paved structure 1b according to the second embodiment has an electromagnetic wave shield 14 so as to cut off electromagnetic waves other than those emitted to a traveling body 2. As a result, the paved structure 1b can reduce electromagnetic waves propagating from the power feeding bodies 12 to the ground.

Third Embodiment

Figure 8:
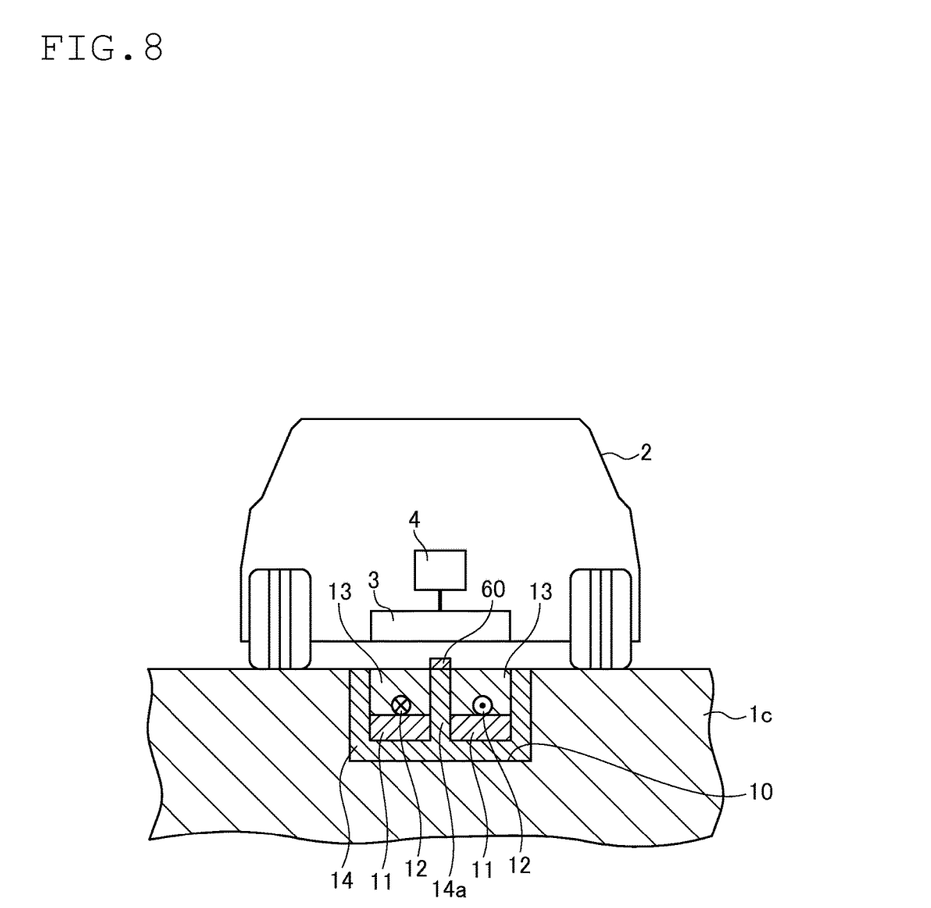
FIG. 8 shows a schematic cross-sectional view of the paved structure according to the third embodiment of the present invention.

The paved structure 1c according to the third embodiment of the present invention is the same as the paved structure 1b according to the second embodiment except that the electromagnetic wave shield 14 has a partition 14a in the center of the depression to form two grooves in the depression as shown in FIG. 8. The explanation of the same part is left out.

The electromagnetic wave shield 14 has two grooves each having a power feeding body 12.

The partition 14a of the electromagnetic wave shield 14 separates the power feeding bodies 12 laid in the respective grooves from each other so as to prevent electromagnetic waves emitted from the respective power feeding bodies 12 from canceling each other out.

The method of constructing the paved structure 1c according to the third embodiment is described below in reference to FIGS. 9A to 9E.

Step of Forming Depression

Figure 9A:
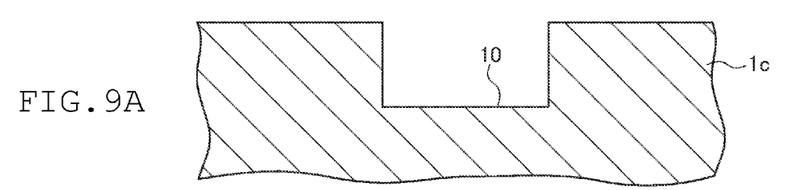
FIGS. 9A to 9E show a process cross-sectional view illustrating the method of constructing the paved structure according to the third embodiment of the present invention.

First, in the step shown in FIG. 9A, a depression 10 with a desired width and a desired depth is formed in the paved structure 1b with a cutter, etc.

Step of Laying Electromagnetic Wave Shield

Figure 9B:
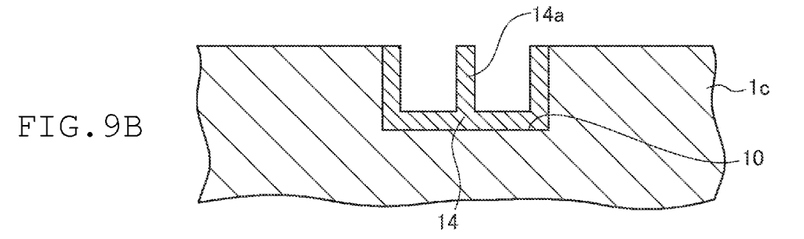

Subsequently, in the step shown in FIG. 9B, an electromagnetic wave shield 14 with a partition 14a forming two grooves is laid in contact with the inner surface of the depression 10.

Step of Laying Magnetic Body

Figure 9C:
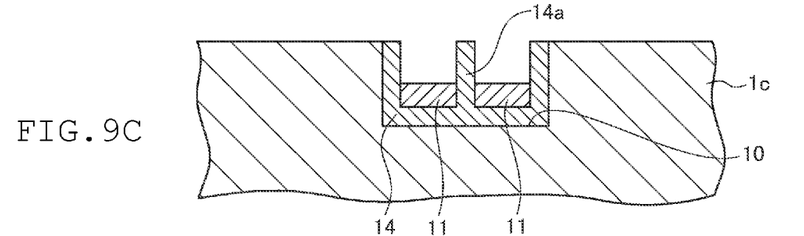

Subsequently, in the step shown in FIG. 9C, a magnetic member 11 is laid in each of the two grooves of the electromagnetic wave shield 14.

Step of Laying Power Feeding Body

Figure 9D:
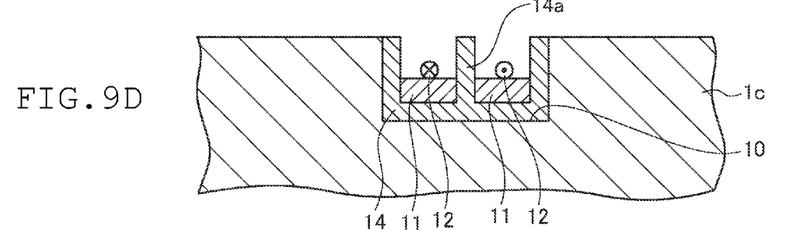

Subsequently, in the step shown in FIG. 9D, power feeding bodies 12 are laid on the magnetic member 11 laid in each of the grooves. Since integrally wired, the power feeding bodies 12 are efficiently laid by a cable laying car and a cable reel car.

Step of Laying Power Feeding Body Protector

Figure 9E:
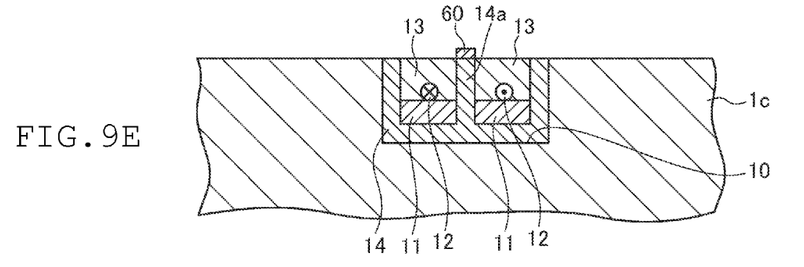

Subsequently, in the step shown in FIG. 9E, a power feeding body protector 13 is laid to cover the power feeding bodies 12 laid on the magnetic member 11. For example, cement asphalt emulsion mortar (CAM) can be used as the power feeding body protector 13.

In addition, dense-graded asphalt concrete or polymer-cement concrete may be laid on the surface layer of the paved structure 1c.

In addition, a visible part 60 may be provided on the surface layer of the paved structure 1c, particularly the surface of the partition 14a of the electromagnetic wave shield 14 to make the position in which the power feeding bodies 12 are buried visible from a traveling body 2. Specifically, the visible part 60 that is, for example, specially paved and extends in the direction in which the partition 14a extends is provided on the surface of the partition 14a to inform a driver who drives a traveling body 2 about the position in which the power feeding bodies 12 are buried.

The thus formed paved structure 1c according to the third embodiment of the present invention can obtain a similar effect to that of the paved structure 1b according to the second embodiment.

Furthermore, the paved structure 1c according to the third embodiment has a partition 14a of the electromagnetic wave shield 14 so as to prevent electromagnetic waves emitted from the respective power feeding bodies 12 from canceling each other out. As a result, the paved structure 1*c* can emit strong electromagnetic waves to a traveling body 2.

Other Embodiments

The present invention is described above in reference to the embodiments. However, it should not be understood that the description and the drawings incorporated in this disclosure limit the present invention. Various alternative embodiments, examples, and operation technologies of this disclosure will be apparent to those skilled in the art.

For example, the visible part 60 is paved with a red color mixture by mixing iron oxide (red oxide, $Fe_2O_3$) in the dense-graded asphalt mixture for surface layer of the paved structures 1*a*, 1*b*, and 1*c*. Therefore, the visible part 60 has a different color from those of other pavements to inform a driver about the position in which the power feeding bodies 12 are buried. The visible part 60 may be paved with a retro reflective material to inform a driver by its reflection about the position in which the power feeding body 12 is buried.

It thus should be understood that the present invention encompasses various embodiments, etc. not described herein. Therefore, the present invention is limited only to matters to define an invention which are stated in claims appropriate from this disclosure.

REFERENCE SIGNS LIST

1*a*, 1*b*, 1*c* Paved structure
2 Traveling body
3 Power receivers
4 Secondary cell
5 Power feeding facility
10 Depressions
11 Magnetic member
12 Power feeding body
13 Power feeding body protector
14 Electromagnetic wave shield
40 Reinforcement
50 Power feeding line
60 Visible part

The invention claimed is:

1. A paved structure feeding power to a power receiver provided in a traveling body through an electromagnetic wave, comprising:

a depression extending in the direction in which the traveling body runs;
a magnetic member laid in the depression so that a flat upper surface is formed;
a power feeding body laid on the upper surface of the magnetic member to feed power to the power receiver through an electromagnetic wave; and
a power feeding body protector laid in the depression to cover the power feeding body, and
a reinforcement that is a mesh net having a predetermined constant width and a constant length laid in the depression, wherein the power feeding body is coiled and attached to the net.

2. The paved structure according to claim 1, wherein an electromagnetic wave shield is concaved on the inner surface of the depression, and the magnetic member is laid in the concave of the electromagnetic wave shield.

3. The paved structure according to claim 2, wherein the electromagnetic wave shield has a partition in the center of the depression to form two grooves in the depression, and the power feeding body is laid in each of the two grooves.

4. The paved structure according to claim 2, wherein the electromagnetic wave shield is formed from a stainless panel or net, an aluminum panel or net, or combination thereof.

5. The paved structure according to claim 1, wherein the power feeding body protector is the same magnetic body as or a different magnetic body from the magnetic member.

6. The paved structure according to claim 1, wherein the magnetic member contains magnetic slag.

7. The paved structure according to claim 1, further comprising:
a visible part visible from the traveling body, wherein the visible part is provided on the upper surface of the power feeding body protector over the power feeding body.

8. The paved structure according to claim 7, wherein the visible part is colored in a color different from that of the power feeding body protector.

9. The paved structure according to claim 7, wherein the visible part is formed of a retro reflective material.

10. A method of constructing the paved structure according to claim 1, comprising the steps of:
forming a depression in the paved structure;
laying a magnetic member in the depression; and
laying a power feeding body on the magnetic member.

* * * * *